L. M. OTWELL.
Plow and Cultivator.
No. 210,351. Patented Nov. 26, 1878.
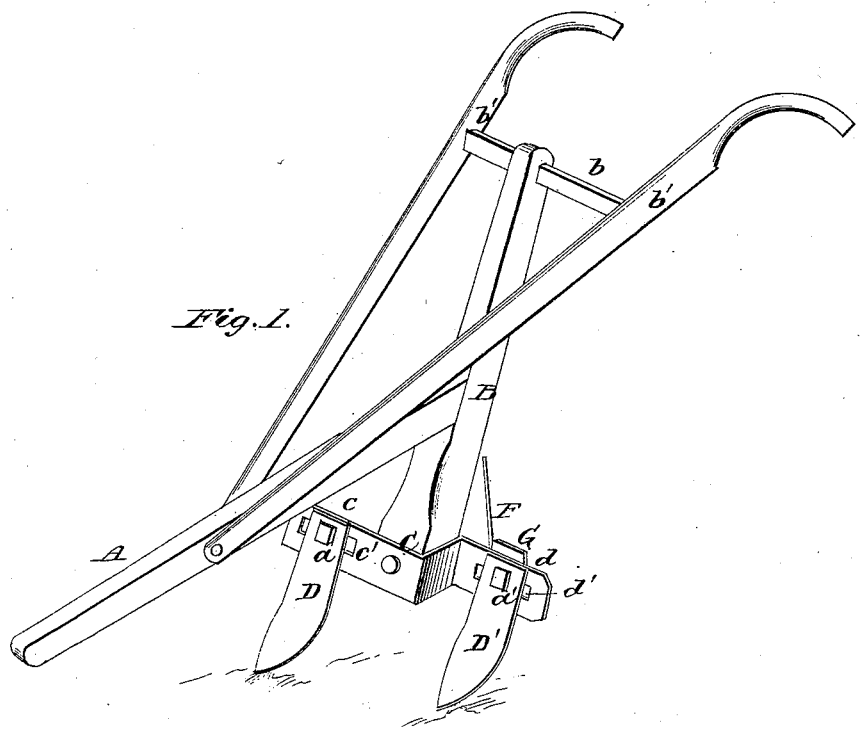
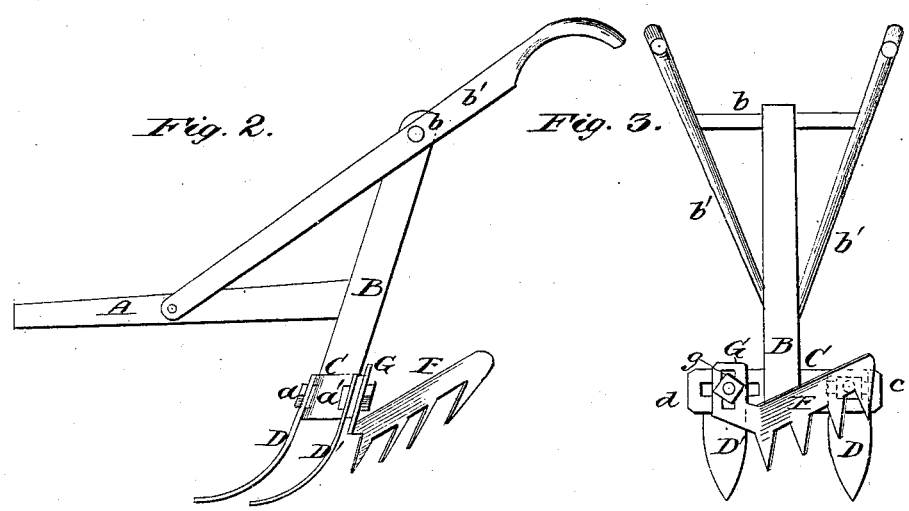
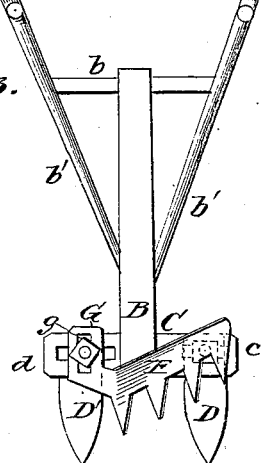

UNITED STATES PATENT OFFICE.

LITTLETON M. OTWELL, OF ROSWELL, GEORGIA.

IMPROVEMENT IN PLOWS AND CULTIVATORS.

Specification forming part of Letters Patent No. 210,351, dated November 26, 1878; application filed July 29, 1878.

*To all whom it may concern:*

Be it known that I, LITTLETON M. OTWELL, of Roswell, in the county of Cobb and State of Georgia, have invented certain new and useful Improvements in Plows and Cultivators; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a side elevation, and Fig. 3 is a rear elevation.

Similar letters of reference denote corresponding parts in all the figures.

This invention relates to certain improvements in plows and cultivators; and it consists in the combination, with a foot constructed as hereinafter described, of two laterally-adjustable plow or cultivator blades and a vertically-adjustable rake or harrow, all as hereinafter more fully shown and described.

In the drawings, A is the draft-beam, which is mortised at its rear end into a slanting beam, B, having a cross-bar, $b$, to the ends of which the handles $b'$ $b'$ are secured, their lower ends being bolted to the beam A in the usual manner.

To the lower end of beam B is secured the angular foot-plate C, which is constructed, as shown in Fig. 1, so as to form wings $c$ $d$, projecting laterally from the forward and rear sides of the beam, respectively, and having horizontal slots $c'$ $d'$.

D D' are the cultivator or plow blades, which are secured by bolts and nuts $a$ $a'$ to the wings $c$ $d$, the slots in which permit the lateral adjustment of the blades.

Upon the same bolt by which the blade D' is secured to the rear wing, $d$, I arrange a rake, F, which is set at an angle, and the body of which, G, has a vertical slot, $g$, which thus enables the rake to be adjusted vertically.

The rake, it will be observed, is set slantingly in relation to the wing $d$, thus causing it to operate easily and with good effect.

The operation and advantages of my invention will readily appear from the foregoing description.

When, as is usually the case, after a heavy rain, the soil is hard or baked, the rake (or harrow, which may be substituted for it) is useful in breaking or pulverizing the clods. It will also be found efficient for cutting or chopping the weeds and stubble and for evening the soil. Being adjustable vertically, it may be set to suit any depth of furrow; and the blades D D', being adjustable laterally, may be set to make the furrows any required distance apart.

Having thus described my invention, I claim and desire to secure by Letters Patent of the United States—

The combination, with the angular foot-plate C, having horizontally-slotted wings $c$ $d$, of the laterally-adjustable blades D D' and the rake or harrow F, set at an angle, and the body of which, G, is slotted vertically, to permit its vertical adjustment, all arranged and operating substantially as herein described, and for the purposes shown and specified.

In testimony that I claim the foregoing as my own I have hereto affixed my signature in presence of two witnesses.

LITTLETON M. OTWELL.

Witnesses:
JNO. R. PROUDFOOT,
J. C. KAELPEN.